(12) United States Patent
De Jong

(10) Patent No.: US 6,709,182 B1
(45) Date of Patent: Mar. 23, 2004

(54) RETAINING ELEMENT FOR CAP SCREWS

(75) Inventor: Michael De Jong, Binzen (DE)

(73) Assignee: A. Raymond & CIE (FR)

( * ) Notice: Subject to any disclaimer, the term of this patent is extended or adjusted under 35 U.S.C. 154(b) by 0 days.

(21) Appl. No.: 10/089,579

(22) PCT Filed: Sep. 16, 2000

(86) PCT No.: PCT/EP00/09060
§ 371 (c)(1),
(2), (4) Date: Mar. 29, 2002

(87) PCT Pub. No.: WO02/29262
PCT Pub. Date: Apr. 11, 2002

(30) Foreign Application Priority Data

Sep. 30, 1999 (DE) .......................... 199 46 890

(51) Int. Cl.$^7$ ................................ F16B 37/02
(52) U.S. Cl. ............. 403/12; 403/399; 411/112; 411/104; 411/175
(58) Field of Search ................ 411/111, 107, 411/103, 112, 113, 352, 353, 174, 175; 248/75, 65, 74.2; 403/7, 11, 12, 21, 34, 201, 212, 213, 256, 258, 260, 231, 262, 317, 399, 397

(56) References Cited

U.S. PATENT DOCUMENTS

| | | | |
|---|---|---|---|
| 2,336,319 A | | 12/1943 | Tinnerman |
| 2,381,936 A | | 8/1945 | Sargent |
| 2,495,037 A | * | 1/1950 | Tinnerman .................. 411/112 |
| 2,631,634 A | * | 3/1953 | Tinnerman .................. 411/113 |
| 2,633,886 A | * | 4/1953 | Tinnerman .................. 411/112 |
| 2,748,906 A | | 6/1956 | Flora |
| 3,217,772 A | | 11/1965 | Adams |
| 5,951,223 A | | 9/1999 | Lindquist |

* cited by examiner

Primary Examiner—Gregory J. Binda
Assistant Examiner—Ryan M. Flandro
(74) Attorney, Agent, or Firm—Gifford, Krass, Groh, Sprinkle, Anderson & Citkowski, P.C.

(57) ABSTRACT

The invention relates to a holding element for holding a fastener to be secured to a carrier plate. The holding element includes a holding plate having a hole that is adapted to receive a fastener. An intermediate portion extends from the holding plate substantially parallel to an axis of the hole. An end portion extends from the intermediate portion substantially parallel to the holding plate. A mounting element extends from the holding plate in a direction away from the carrier plate and is adapted to hold a construction element wherein the mounting element is integrally formed on the holding plate.

5 Claims, 1 Drawing Sheet

RETAINING ELEMENT FOR CAP SCREWS

This application is a national stage filing under 35 U.S.C. 371 of PCT Application PCT/EP00/09060, filed Sep. 16, 2000, which claims priority from German Application No. 19946890.7, filed Sep. 30, 1999.

BACKGROUND OF THE INVENTION

1. Field of the Invention

The invention pertains to a holding element for holding a screw. The holding element is connected in an integral fashion to a mounting element for use in mounting construction elements.

2. Reference to Related Art

A holding element which, in particular, serves for holding polygonal cap screws is already known from U.S. Pat. No. 2,748,906. In that case, a limb that is integrally formed onto a holding plate and is bent upward parallel to a screw axis and two additional limbs are bent rearward parallel to the holding plate above a screw head. Therefore, the holding element of the '906 patent is neither intended nor suitable for holding screws in a captive fashion because it merely serves for securing a screw shaft in a hole of a carrier plate by laterally pushing the holding element over the screw head after the shaft has been inserted into a mounting hole of the carrier plate.

The holding element of the present invention is designed in such a way that a screw is rotatably held by the holding element. The holding element can be rapidly and easily screwed down in a mounting hole with the securely held screw when the holding element is attached to a carrier plate.

SUMMARY OF THE INVENTION

According to the present invention, an end portion is spaced apart from a holding plate by a distance that is smaller than the total length of a screw by at least one thread pitch. The design of the holding element in accordance with the invention ensures that an inserted screw is unable to move out of a hole in a holding plate such that it is always held in a position in which it is ready to be screwed down. In addition, the screw is able to be unscrewed until it contacts the end portion. This makes it possible for the threaded shaft to remain sunk in the holding element until it is positioned above a mounting hole at the intended place of use and able to drop into the hole.

The holding element of the present invention is used for holding a screw, preferably a pan head screw, which can be screwed down with an appropriate screwdriver without interruptions. The holding element is also suitable for holding hexagonal cap screws or other types of screws. However, hexagonal screws make it necessary to disengage and engage anew an open-end wrench after slight turning of the screw due to the obstructing limb.

Additionally, the present invention permits superior axial guidance of the screw in the holding element through the use of holding tabs. When using the tabs to tighten down a screw, the screw shaft consequently is situated in the correct position and axially aligned relative to the thread of the nut situated underneath.

BRIEF DESCRIPTION OF THE DRAWINGS

The characteristics and design features of a preferred and alternative embodiment of the invention is described in greater detail below with reference to the figures. The figures show FIG. 1, a side view of a holding element for screws with a mounting element and a screw arranged therein.

DETAILED DESCRIPTION

Figure 1:
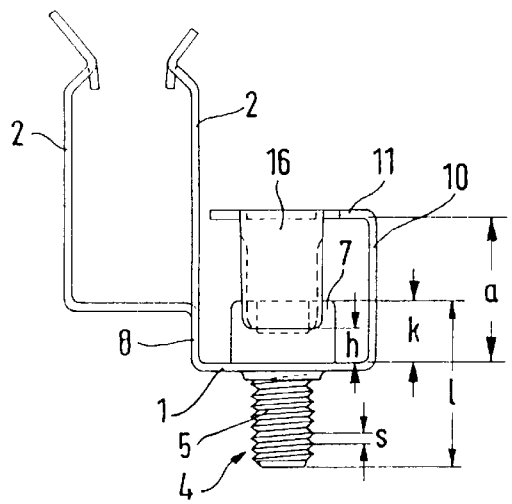
Figure 2:
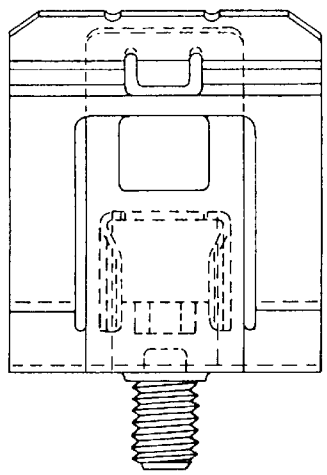
FIG. 2, a front view of the same holding element.
Figure 3:
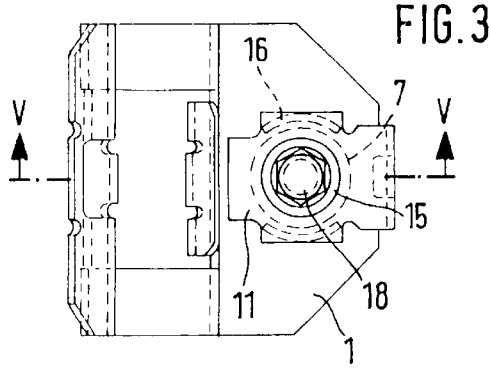
FIG. 3, a top view of the same holding element.
Figure 4:
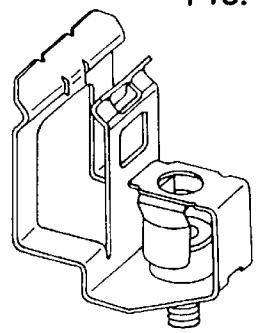
FIG. 4, a perspective representation of the same holding element.
Figure 5:
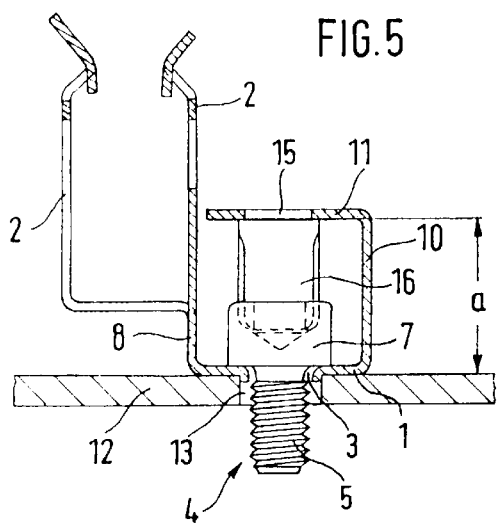
FIG. 5, the same holding element in the mounted state in the form of a section along the line V—V in FIG. 3, and FIG. 6, a section through a second holding element with another mounting element and a hexagonal screw arranged therein in the mounted state.

Referring now to FIGS. 1–5, a holding element for a screw is normally utilized for mounting construction elements or functional elements on carrier plates. For this purpose, the holding element includes a holding plate 1 that is rigidly connected to a suitable mounting element 2 and is provided with a hole 3 for inserting a shaft 5 of a screw 4.

Still referring to FIGS. 1–5, an intermediate portion 10 is integrally formed onto the other side of the hole 3 and bent upward parallel to the axis of the screw 4 (or an axis of the hole 3) that is positioned in the hole 3 of the holding plate 1. An end portion 11 is integrally formed onto the itermediate portion 10 slightly above the head 6 of the screw to be inserted and is bent rearward parallel to the holding plate 1. The mounting element 2 with the holding plate 1 and the screw 4 arranged in the hole 3 can thus be tightly screwed to a carrier plate 12 (see FIG. 5) by means of a nut 14, wherein the carrier plate 12 is provided with a corresponding mounting hole 13 for receiving the screw shaft 5.

Still referring to FIGS. 1–5, the holding plate 1 is preferably connected on one side to the mounting element 2 via a web 8. The mounting element includes a pair of clamping elements 2a that accommodate a component of rectangular cross section, for example, a cable duct (not shown). On the opposite side, the holding plate 1 is provided with the intermediate portion 10 and the end portion bent 11 that is bent rearward over a head 7 (e.g., a pan head). A recess 15 for inserting a screwdriver into the engagement recess 18 of the head 7 is provided in the end portion 11 in an axial extension of the head 7. It will be appreciated that the engagement recess 18 may include a hexagon socket or have another profile suitable for transmitting a torque.

The rearwardly bent end portion 11 is preferably spaced apart from the holding plate 1 by a distance "a" that is smaller than the total length "1" of the cap screw 4 by at least one thread pitch "s" of the shaft 5. In addition, two holding tabs 16 are integrally formed onto the front and rear of the end portion 11. The tabs 16 extend downward on both sides of the screw head 7 and are bent such that they extend parallel to the cylindrical wall 17 of the screw head 7. More particularly, the holding tabs 16 are shaped concentric to the wall 17 of the head 7 in order to achieve a superior guidance of the head 7. The holding tabs 16 end at a height "h" above the holding plate 1. The height h is at least smaller than the height "k" of the head 7.

Figure 6:
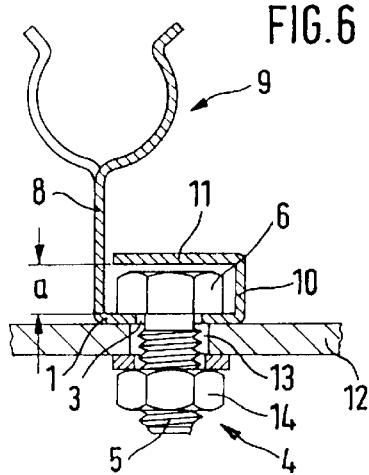

Referring now to FIG. 6, there is shown an alternative embodiment of the present invention. As can be seen, the alternative embodiment is similar to the preferred embodiment except that the web 8 and a clamp 9 are integrally formed onto the holding plate 1 on one side of the hole 3. It will be appreciated that the clamp 9 of the alternative embodiment serves for holding pipes, cable ducts or the like.

I claim:

1. A holding element for holding a fastener for securing the fastener to a carrier plate comprising:

a holding plate having a hole that is adapted to receive said fastener, an intermediate portion extending from said holding plate substantially parallel to an axis of said hole and an end portion extending from said intermediate portion substantially parallel to said holding plate;

a mounting element extending from said holding plate in a direction away from said carrier plate, said mounting element adapted to hold a construction element; and said mounting element comprising a pair of spaced clamping elements for holding the construction element therebetween.

2. The holding element of claim 1, wherein said mounting element is integrally formed on said holding plate.

3. The holding element of claim 1, wherein said end portion further comprises a holding tab that extends from said end portion.

4. The holding element of claim 3, said holding tab is parallel to a wall of a head of said fastener.

5. The holding element of claim 4, said holding tab has a length that terminates at a height above said holding plate that is smaller than a height of said head of said fastener.

* * * * *